A. BALDWIN.
VALVE FOR DRAINING WATER FROM STEAM PIPES.
APPLICATION FILED NOV. 26, 1915.
1,196,418.                                              Patented Aug. 29, 1916.
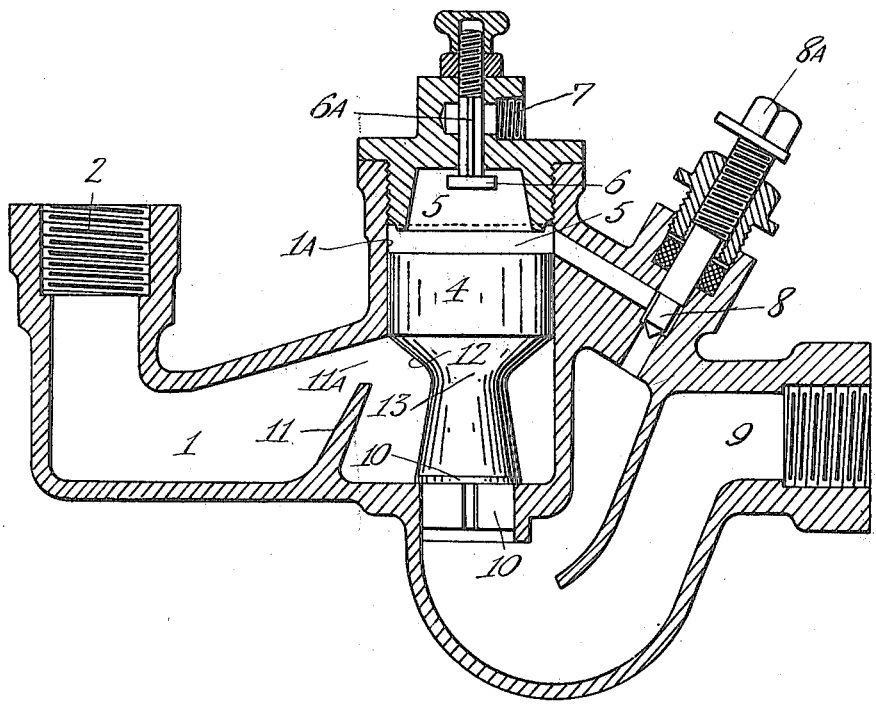
Inventor:
Alfred Baldwin,
by Spear, Middleton, Donaldson & Spear
Attys.

UNITED STATES PATENT OFFICE.

ALFRED BALDWIN, OF KEIGHLEY, ENGLAND.

VALVE FOR DRAINING WATER FROM STEAM-PIPES.

1,196,418.  Specification of Letters Patent.  Patented Aug. 29, 1916.

Application filed November 26, 1915. Serial No. 63,655.

*To all whom it may concern:*

Be it known that I, ALFRED BALDWIN, a subject of the King of Great Britain and Ireland, and resident of Devonshire Brass Works, Keighley, in the county of York, England, have invented a certain new and useful Improvement Relating to Valves for Draining Water from Steam-Pipes, of which the following is a specification.

This invention relates to fluid pressure relief valves arranged in such manner, that a valve constructed in accordance with my invention, and connected to a range of steam heating or other supply pipes, will automatically drain the said pipes of water condensed from the steam, in a manner that the damaging effects of the forward flow of the water pulsations, or what is sometimes termed "water hammer" within the pipes, is instantly relieved by the forward pulsation flow acting on the underside of the piston of the relief valve, by which said valve is opened and the liability of fracturing the pipes removed by the escape of the periodic ebbing flow of the water within the pipes, when traveling in the direction of the valve casing.

In describing my invention in detail reference is made to the accompanying drawing representing a longitudinal sectional view through the center of a relief valve casing made according to my invention.

In carrying out my object, the inlet to the interior of the valve casing 1, may be through opening such as 2, the inlet branch being suitably connected to a range of steam pipes.

The interior of the casing is provided with a piston 4, free to slide within the cylindrical portion 1$^A$ of casing, a cavity 5 being formed above the piston 4, said cavity being provided with an air outlet valve 6, communicating through opening 7, with the atmosphere when in the position shown.

When there is no pressure in the connected range of steam pipes, the air outlet valve 6 falls by gravity to the position shown, the spindle of which may be grooved, or flats 6$^A$ formed longitudinally thereon, so that on admitting steam into the range of pipes, the air can escape through said grooves or flats 6$^A$, to the atmosphere.

The piston 4 is sufficiently free in the cylindrical portion 1$^A$, to allow the air or steam to pass into the cavity 5, and on the pressure within said cavity increasing to an extent to raise and close the air outlet valve 6, it is held in that position by the pressure acting on the underside or back of valve.

The automatically operated air outlet valve 6 may be and is by preference supplemented by another outlet valve 8, the opening and closing of which is controlled by the turning of spindle 8$^A$, in the direction required for allowing air to escape more quickly, on admitting steam to the range of pipes, which when charged with steam, said valve is adjusted in its width of opening to allow when desired, some of the steam passing the free fitting piston 4 into the cavity 5, to escape from said cavity and insure a lower pressure therein, than that on the underside of piston and within the range of steam pipes connected thereto; thereby enabling the main relief or outlet valve 10, to be automatically controlled in the manner as hereinafter described.

Connected to the piston 4, is the main relief outlet valve 10, preferably of less diameter than the piston, the outlet of said valve communicating with the outlet branch 9 of valve casing 1 as clearly shown.

The main outlet valve 10 is normally held in its closed position by the gravity of piston 4 and distance piece connecting said piston to valve 10, in addition to the pressure of steam acting upon the upper surface of said valve, and by the steam pressure acting upon the upper surface of piston within the cavity 5, where the pressure is somewhat reduced in the manner as before described.

Within the inlet branch of valve casing 1, is a deflecting plate 11, extending across the inlet, and of such height as to leave a clear open space 11$^A$, at the top of plate. On the periodic forward ebbing or "water hammer" flow within the pipes arriving at the plate 11, the flow is diverted, and the current deflected against the conical surface 12 of distance piece on the underside of piston 4, with such force as to raise said piston, and lift the main outlet valve 10 from its seat, thus opening a communication with the outlet branch 9, thereby instantly releasing the local "water hammer" pressure within the valve casing and connected pipes, thus automatically and periodically draining the pipes of water whenever the force of the forward flow of the periodic pulsations is sufficient to raise the outlet valve 10 from its seat.

When the internal local excessive pressure within the pipes and valve casing is reduced on the return of the ebbing flow of the water, the main outlet valve 10 closes automatically, such closing being effected by the internal pressure in the cavity 5 of valve casing, acting on the top surface of piston 4, this surface having a greater effective area than the area of the conical surface 12, which is less by about the area of the reduced circular portion 13 of the conical distance piece, this additional area of the piston 4 being subjected to pressure, in conjunction with the gravity of the piston and conical distance piece, closes valve 10, which is kept closed, until the next forward pulsation of water impinges with sufficient force upon the conical surface 12, to open the main outlet valve 10 for a period sufficient to relieve the excessive local pressure caused by the forward movement of the "water hammer" flow.

What I claim as my invention is:—

A releasing valve comprising a casing, a releasing valve for the air therein, a movable piston and a main outlet valve connected thereto, normally closed by gravity, said piston having a conical surface and a deflecting plate for diverting the flow to said surface to raise the main valve from its seat.

In witness whereof I have hereunto set my hand to this specification in the presence of two witnesses.

ALFRED BALDWIN.

Witnesses:
ALFRED DEAN,
JOHN GILL.

Copies of this patent may be obtained for five cents each, by addressing the "Commissioner of Patents, Washington, D. C."